(12) United States Patent
Tidwell

(10) Patent No.: US 9,791,558 B2
(45) Date of Patent: *Oct. 17, 2017

(54) TWO-COLOR SIGNATURE SIMULATION USING MID-INFRARED TEST SOURCE SEMICONDUCTOR LASERS

(71) Applicant: Lockheed Martin Corporation, Bethesda, MD (US)

(72) Inventor: Steven C. Tidwell, Prescott, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/710,440

(22) Filed: May 12, 2015

(65) Prior Publication Data

US 2016/0334510 A1 Nov. 17, 2016

Related U.S. Application Data

(62) Division of application No. 12/228,277, filed on May 14, 2008, now Pat. No. 9,031,414.

(Continued)

(51) Int. Cl.
*H04B 10/00* (2013.01)
*G01S 7/495* (2006.01)
(Continued)

(52) U.S. Cl.
CPC .............. *G01S 7/495* (2013.01); *F41H 11/02* (2013.01); *F41H 13/0056* (2013.01); *F42B 5/15* (2013.01); *F42B 12/46* (2013.01); *H04B 10/25* (2013.01)

(58) Field of Classification Search
USPC .................................................. 398/9, 16, 39
See application file for complete search history.

(56) References Cited

U.S. PATENT DOCUMENTS 3,857,042 A * 12/1974 LaGrange ............... F41G 7/005
244/3.16
4,173,777 A * 11/1979 Schmit .................... F41G 7/301
250/203.6

(Continued)

FOREIGN PATENT DOCUMENTS

EP 1708318 A1 10/2006
GB 2400644 A 10/2004

OTHER PUBLICATIONS

Chow, et al., "Protecting Commercial Aviation Against the Shoulder-Fired Missle Threat.", "Rand: Infrastructure, Safety, and Environment", 2005.

*Primary Examiner* — Agustin Bello
(74) *Attorney, Agent, or Firm* — Charles A. Lemaire; Jonathan M. Rixen; Lemaire Patent Law Firm, P.L.L.C.

(57) ABSTRACT

In some embodiments, the present invention provides an apparatus and process that includes control electronics that generate an electronic control signal; and a plurality of optically or electrically pumped semiconductor lasers, quantum-cascade lasers, optical parametric generators, or optical parametric oscillators, operatively coupled to the control electronics, that output an optical signal having a plurality of wavelengths, each wavelength having an output intensity that each of which is varied over time to simulate a combustion signature of a weapon. In some embodiments, the optical signal includes at least two different infrared wavelengths that are varied differently with time.

20 Claims, 6 Drawing Sheets

Related U.S. Application Data

(60) Provisional application No. 60/930,358, filed on May 14, 2007, provisional application No. 60/931,322, filed on May 15, 2007.

(51) Int. Cl.
*F41H 11/02* (2006.01)
*F42B 5/15* (2006.01)
*F42B 12/46* (2006.01)
*H04B 10/25* (2013.01)
*F41H 13/00* (2006.01)

(56) References Cited

U.S. PATENT DOCUMENTS

| | | | | |
|---|---|---|---|---|
| 4,864,146 A * | 9/1989 | Hodges | | F23N 5/082 250/494.1 |
| 5,224,860 A * | 7/1993 | Waldman | | F41G 7/006 250/330 |
| 5,324,937 A | 6/1994 | Chen et al. | | |
| 5,336,894 A * | 8/1994 | Ellers | | G01J 5/522 250/504 R |
| 5,378,890 A | 1/1995 | Wes et al. | | |
| 5,495,562 A * | 2/1996 | Denney | | G06T 15/10 345/421 |
| 5,523,579 A * | 6/1996 | Orlando | | H04N 5/33 250/493.1 |
| 5,627,362 A * | 5/1997 | Youngquist | | F21L 15/02 250/205 |
| 5,693,951 A * | 12/1997 | Strong, III | | F41G 7/224 250/504 R |
| 5,703,314 A | 12/1997 | Meeker | | |
| 5,970,024 A * | 10/1999 | Smith | | F41H 11/00 367/128 |
| 6,020,955 A | 2/2000 | Messina | | |
| 6,123,288 A * | 9/2000 | Kenyon | | F41G 7/004 244/3.16 |
| 6,288,381 B1 | 9/2001 | Messina | | |
| 6,531,691 B1 * | 3/2003 | Pruet | | G01J 1/42 250/216 |
| 6,553,045 B2 | 4/2003 | Kaspi | | |
| 6,587,486 B1 * | 7/2003 | Sepp | | F41H 11/02 372/20 |
| 6,643,305 B2 * | 11/2003 | Bewley | | B82Y 20/00 372/45.01 |
| 6,684,622 B2 * | 2/2004 | Vickery | | F02K 1/08 239/265.15 |
| 6,782,020 B2 * | 8/2004 | Scully | | B82Y 20/00 372/21 |
| 6,813,296 B2 | 11/2004 | Goyal et al. | | |
| 6,825,791 B2 * | 11/2004 | Sanders | | G01S 7/38 250/504 R |
| 6,873,893 B1 | 3/2005 | Sanghera et al. | | |
| 6,878,923 B2 | 4/2005 | Casteleiro | | |
| 6,879,447 B2 | 4/2005 | Casteleiro | | |
| 6,958,813 B1 * | 10/2005 | Ahmadjian | | F41H 11/02 356/311 |
| 6,980,151 B1 * | 12/2005 | Mohan | | G01S 7/414 342/118 |
| 6,980,152 B2 * | 12/2005 | Steadman | | F41H 11/02 342/14 |
| 7,047,801 B2 * | 5/2006 | Stephens | | G01M 3/3254 250/252.1 |
| 7,230,221 B2 * | 6/2007 | Busse | | G01J 1/4228 250/203.6 |
| 7,238,957 B2 * | 7/2007 | Bailey | | F41G 1/54 250/504 R |
| 7,239,653 B2 * | 7/2007 | Setzler | | G02F 1/39 372/20 |
| 7,280,215 B2 * | 10/2007 | Salnik | | G01N 21/1717 356/432 |
| 7,330,665 B2 * | 2/2008 | Yap | | H04B 10/50 398/187 |
| 7,378,626 B2 * | 5/2008 | Fetterly | | F41G 7/224 244/1 R |
| 7,391,561 B2 | 6/2008 | Di Teodoro et al. | | |
| 7,469,001 B1 * | 12/2008 | Ongstad | | H01S 5/041 372/36 |
| 7,512,161 B2 * | 3/2009 | Dadson | | G01J 5/522 250/316.1 |
| 7,528,396 B1 * | 5/2009 | Vavroch | | F41G 7/002 250/504 R |
| 7,539,231 B1 | 5/2009 | Honea et al. | | |
| 7,545,836 B1 | 6/2009 | Borshowa et al. | | |
| 7,550,931 B2 * | 6/2009 | Lys | | A01M 1/04 315/291 |
| 7,582,853 B2 * | 9/2009 | Teneze | | G01S 3/784 244/3.1 |
| 7,620,077 B2 | 11/2009 | Henderson | | |
| 7,679,733 B2 * | 3/2010 | Carter | | F41G 7/224 356/139.03 |
| 7,688,247 B2 * | 3/2010 | Anschel | | F41H 11/02 244/3.1 |
| 7,729,574 B2 * | 6/2010 | Moriarty | | G02B 6/0288 219/121.6 |
| 7,738,522 B2 * | 6/2010 | Henrichs | | H01S 5/18391 372/29.02 |
| 7,764,026 B2 * | 7/2010 | Dowling | | A61N 5/06 315/307 |
| 7,777,207 B2 * | 8/2010 | Bailey | | F41G 1/54 250/201.9 |
| 7,999,228 B2 * | 8/2011 | Staniforth | | B82Y 20/00 250/338.1 |
| 8,082,832 B1 * | 12/2011 | Tidwell | | F41H 11/02 250/495.1 |
| 8,185,350 B2 * | 5/2012 | Deriso, Jr. | | F41G 7/002 244/1 N |
| 9,031,414 B1 * | 5/2015 | Tidwell | | F41H 11/02 398/118 |
| 9,212,872 B2 * | 12/2015 | Tamir | | F41A 33/00 |
| 9,267,770 B2 * | 2/2016 | Gaska | | F41J 2/00 |
| 9,410,849 B2 * | 8/2016 | Bell | | G01J 5/0265 |
| 2003/0035301 A1 * | 2/2003 | Gardiner | | A61N 5/0619 362/583 |
| 2004/0037496 A1 * | 2/2004 | Pierce | | G02B 6/4206 385/28 |
| 2005/0002673 A1 * | 1/2005 | Okano | | H04B 10/116 398/130 |
| 2005/0280785 A1 * | 12/2005 | Beeson | | H04N 9/3117 353/97 |
| 2007/0058686 A1 * | 3/2007 | Capasso | | B82Y 20/00 372/43.01 |
| 2008/0169423 A1 * | 7/2008 | Betschart | | G01J 1/04 250/372 |
| 2009/0254307 A1 * | 10/2009 | Deriso, Jr. | | F41G 7/002 702/182 |
| 2009/0309037 A1 * | 12/2009 | Cox | | G01J 1/02 250/372 |
| 2010/0051794 A1 * | 3/2010 | Rogers | | G01J 5/0022 250/252.1 |
| 2014/0222397 A1 * | 8/2014 | Jew | | G06F 17/5036 703/2 |
| 2014/0233035 A1 * | 8/2014 | Islam | | H01S 5/0064 356/456 |
| 2015/0177365 A1 * | 6/2015 | Chabinsky | | G01S 7/495 702/77 |
| 2015/0323656 A1 * | 11/2015 | Soletsky | | F41G 7/224 250/492.1 |
| 2015/0346329 A1 * | 12/2015 | Egbert | | G01S 7/495 250/338.1 |
| 2016/0010971 A1 * | 1/2016 | Islam | | H01S 5/0064 250/353 |
| 2016/0187125 A1 * | 6/2016 | Corella | | G02B 7/1827 356/139.08 |
| 2016/0334510 A1 * | 11/2016 | Tidwell | | F41H 11/02 |

* cited by examiner

TWO-COLOR SIGNATURE SIMULATION USING MID-INFRARED TEST SOURCE SEMICONDUCTOR LASERS

CROSS-REFERENCE TO RELATED APPLICATIONS

This application is a divisional of U.S. patent application Ser. No. 12/228,277 (which issued as U.S. Pat. No. 9,031,414 on May 12, 2015), which claims benefit under 35 U.S.C. §119(e) of U.S. Provisional Patent Application No. 60/930,358 filed May 14, 2007 and titled "TWO-COLOR MISSILE-SIGNATURE SIMULATION USING SEMICONDUCTOR LASERS (Mid-infrared test source)," and of U.S. Provisional Patent Application No. 60/931,322 filed May 15, 2007 and titled "TWO-COLOR MISSILE-SIGNATURE SIMULATION USING MID-INFRARED TEST SOURCE SEMICONDUCTOR LASERS," each of which is incorporated herein by reference in its entirety.

This invention is related to

U.S. Provisional Patent Application No. 60/699,894 titled "APPARATUS AND METHOD FOR GENERATING CONTROLLED-LINEWIDTH LASER-SEED-SIGNALS FOR HIGH-POWERED FIBER-LASER AMPLIFIER" filed Jul. 15, 2005, U.S. patent application Ser. No. 11/488,910 titled "APPARATUS AND METHOD FOR GENERATING CONTROLLED-LINEWIDTH LASER-SEED-SIGNALS FOR HIGH-POWERED FIBER-LASER AMPLIFIER SYSTEMS" filed Jul. 17, 2006 (which issued as U.S. Pat. No. 7,539,231 on May 26, 2009), U.S. patent application Ser. No. 11/484,358 titled "APPARATUS AND METHOD FOR PUMPING AND OPERATING OPTICAL PARAMETRIC OSCILLATORS USING DFB FIBER LASERS" filed Jul. 10, 2006 (which issued as U.S. Pat. No. 7,620,077 on Nov. 17, 2009), U.S. patent application Ser. No. 11/623,056 titled "APPARATUS AND METHOD FOR TEMPORALLY SHAPING DRIVE CURRENT TO SEED-SIGNAL-LASER-DIODES FOR HIGH-POWERED FIBER-LASER AMPLIFIER SYSTEMS" filed Jan. 12, 2007 (which issued as U.S. Pat. No. 7,545,836 on Jun. 9, 2009), U.S. patent application Ser. No. 11/420,729 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" filed May 26, 2006 (which issued as U.S. Pat. No. 7,391,561 on Jun. 24, 2008), and U.S. Provisional Patent Application No. 60/896,265 titled "HIGH-POWER, PULSED RING FIBER OSCILLATOR" filed Mar. 21, 2007, U.S. patent application Ser. No. 12/053,551 titled "HIGH-POWER, PULSED RING FIBER OSCILLATOR AND METHOD" filed Mar. 21, 2008 (which issued as U.S. Pat. No. 7,876,803 on Jan. 25, 2011), each of which is incorporated herein in its entirety by reference.

STATEMENT REGARDING FEDERALLY SPONSORED RESEARCH OR DEVELOPMENT

A portion of this invention was made with Government support under contract # N68335-05-C-0015 awarded by the U.S. Navy. The Government has certain rights in the invention.

FIELD OF THE INVENTION

The invention relates generally to the making and operation of systems that output a specific optical signal, and more particularly to semiconductor laser systems that output optical signals that simulate various light sources to test and verify operation of various optical sensors, such as sensors and/or warning systems that detect the launch and/or flight of incoming missiles.

BACKGROUND OF THE INVENTION

Certain projectiles can be detected optically using a number of methods and mechanisms, some which provide a sensor-determined direction. Among these are methods using turrets and/or one or more gimbaled mirrors, for example U.S. Pat. No. 6,020,955 "System for pseudo on-gimbal, automatic line-of-sight alignment and stabilization of off-gimbal electro-optical passive and active sensors" issued Feb. 1, 2000 to Peter Messina, which is incorporated herein by reference. Messina describes an optical apparatus for use in auto-aligning line-of-sight optical paths of at least one sensor and a laser, comprising: at least one reference source for outputting at least one reference beam that is optically aligned with the line-of-sight of the at least one sensor, a laser reference source for outputting a laser reference beam that is optically aligned with the line-of-sight of the laser, a laser alignment mirror for adjusting the alignment of the line of sight of the laser beam, a sensor alignment mirror for adjusting the alignment of the at least one sensor, combining optics for coupling the plurality of reference beams along a common optical path, gimbal apparatus, a detector disposed on the gimbal apparatus for detecting the plurality of reference beams, a fine stabilization mirror disposed on the gimbal apparatus for adjusting the line of sight of the optical paths of the at least one sensor and the laser, and a processor coupled to the detector, the laser alignment mirror, the sensor alignment mirror, and the fine stabilization mirror for processing signals detected by the detector and outputting control signals to the respective mirrors to align the line-of-sight optical paths of the sensor and the laser. Other such systems or components are described in U.S. Pat. No. 6,288,381 issued Sep. 11, 2001 to Peter Messina titled "Integrated system for line-of-sight stabilization and auto-alignment of off-gimbal passive and active electro-optical sensors," U.S. Pat. No. 6,878,923 issued Apr. 12, 2005 to Carlos Casteleiro titled "Gimbal assembly for optical imaging system," and U.S. Pat. No. 6,879,447 issued Apr. 12, 2005 to Carlos Casteleiro titled "Optical gimbal apparatus," which are all incorporated herein by reference. Such systems are complex and expensive, and can be difficult to test on a regular basis.

U.S. Pat. No. 6,873,893 issued Mar. 29, 2005 to Sanghera et al. titled "Missile warning and protection system for aircraft platforms," and U.S. Pat. No. 6,813,296 issued Nov. 2, 2004 to Goyal et al. titled "GASB-clad mid-infrared semiconductor laser," which are incorporated herein by reference, describe other components that are used in some embodiments of the present invention.

U.S. Pat. No. 6,553,045 issued Apr. 22, 2003 to Ron Kaspi titled "Multiple wavelength broad bandwidth optically pumped semiconductor laser" is hereby incorporated herein by reference. Kaspi describes an optically pumped semiconductor laser with the active region partitioned such that different wavelengths can be emitted simultaneously from each partitioned region. The material of the partitioning layers is selected to be transparent to the pump wavelength, an electronic barrier to carrier diffusion, and epitaxially compatible with subsequent layers of the laser structure. Kaspi's FIG. 4 shows example output wavelengths of 3.85 microns and 4.11 microns.

There is a need for a low-cost system that simulates various optical sources in order to test and verify continued correct operation of such sensors, and which is much less complex than a conventional tester assembly.

SUMMARY OF THE INVENTION

In some embodiments, the present invention provides an apparatus and process for testing sensors that detect optical signals (of any suitable wavelength, including "colors" in the infrared or ultraviolet as well as in the visible spectrum, wherein different wavelengths or different relative intensities of each of a plurality of wavelengths are considered different colors) that change color over time, called an "optical signature." In some embodiments, the simulated signal is a time-varying optical waveform, wherein each of two or more wavelengths each having a time-varying amplitude (output intensity) is used in the overall waveform to provide the simulated optical signature.

When considering visible light, a certain mixture of green light (e.g., 532 nm from a green output of a diode-pumped solid-state frequency-doubled (DPSSFD) device commonly called a "green laser pointer") and red light (e.g., 650 nm from a red laser diode) provides a color called "yellow" or perceived as yellow, and changing the relative intensities of the two source wavelengths will change the "color" of the mixture. If provided by a single-wavelength source, the color "yellow" can be considered to be between 570 nm and 580 nm, where colors having a wavelength shorter than 570 can be called greenish yellow and colors having a wavelength longer than 580 can be called yellowish orange or yellow. By increasing the relative intensity of the green 532-nm signal relative to the red 650-nm signal, the resulting mixture will appear to the human eye to shift in color towards the yellowish-green (shorter wavelength), while increasing the relative intensity of the red 650-nm signal relative to the green 532-nm signal, the resulting mixture will appear to shift in color towards the orange or red (longer wavelength). In addition, the total intensity of the mixture can also be changed by changing the intensities of both sources (e.g., where both intensities are increased or both intensities are decreased). If one needed to test or verify a detector (the device under test (DUT)) having two sensors (e.g., one sensor that detected green 532-nm light and another that detected 650-nm red light), wherein the detector was supposed to detect, distinguish and identify characteristic optical signatures based on a time-varying total intensity and time-varying relative proportions of the two colors, one could use the present invention to modulate the intensity of the green output from the DPSSFD device and the red output from the red diode laser and observe or sense the response of the DUT. Further, black-body radiation has a characteristic intensity curve that shifts with temperature, and thus by sensing and measuring the relative intensities of two wavelengths (e.g., two wavelengths in the infrared), one can determine the temperatures of a combustion reaction that vary as a function of time such as may be produced by a rocket plume (in each of a plurality of successive timer periods, one measures a plurality of wavelengths in the infrared, and the temperature of a source can be estimated by comparing the relative intensity of the source at two (or more) infrared wavelengths). By outputting time-varying intensities at two (or more) infrared wavelengths that are used by an apparatus that is performing such sensing and measuring operations, one can simulate such a rocket plume.

In some embodiments, the present invention varies the intensities of optical signals from a plurality of lasers or similar devices according to a predetermined intensity-versus-time basis (e.g., controlled using a table-lookup scheme, and analog-electrical-waveform function, or other suitable control method), and then gathers data as to the device-under-test's (DUT's) response. In some embodiments, the plurality of optical signals is bore-sighted (combined into a single collimated beam that includes a plurality of optical signals of different wavelengths, all of which point to the same direction with substantially the same angle of divergence). In some embodiments, a controller controls the plurality of optical signals using a table-lookup method, and provides a plurality of different selectable table data sources, each table data source providing control information that specifies a particular optical signature.

Thus, the present invention, in some embodiments, uses a plurality of intensity-controlled high-brightness light sources (HBLSs) for simulating an optical signature. In some embodiments, the present invention provides an apparatus and method for using one or more optically pumped semiconductor lasers (OPSLs) for simulating the infra-red (IR) optical signature of a missile plume. In some embodiments, the present invention includes an apparatus and method for using one or more quantum-cascade lasers (QCLs) for simulating the infra-red (IR) optical signature of a missile plume. In some embodiments, the present invention includes an apparatus and method for using one or more optical parametric generators (OPGs) and/or optical parametric oscillators (OPOs) for simulating the infra-red (IR) optical signature of a missile plume. In some embodiments, the present invention includes an apparatus and method for using one or more other HBLSs for simulating the infra-red (IR) optical signature of a missile plume. In some embodiments, the optical signature is specified by data in a lookup table. In some embodiments, the table has or can be considered to have a plurality of columns, wherein each column contains data to control one of the plurality of HBLSs. In some embodiments, two or more OPSLs are used, each being pumped using a different time-varying optical signals (each of which can be controlled by an electrical current, in some embodiments) to control its output intensity. In some embodiments, at least one of the OPSLs has a mid-infrared (mid-IR) wavelength.

In contrast to some other embodiments of the present invention, the original concept, using lamps or a solid-state laser and optical parametric oscillator (OPO) parts, required complicated arrangement of rotating circular variable filters in some embodiments to generate the required waveform. Rise time and accuracy were both limited. There was also an issue with synchronizing the laser with the waveform, since the laser had digital (pulsed) output. OPSLs and/or QCLs, as used in some embodiments of the present invention, obviate these issues because the output intensity can be modulated electronically by changing the pump light intensity and/or current.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

Figure 1:
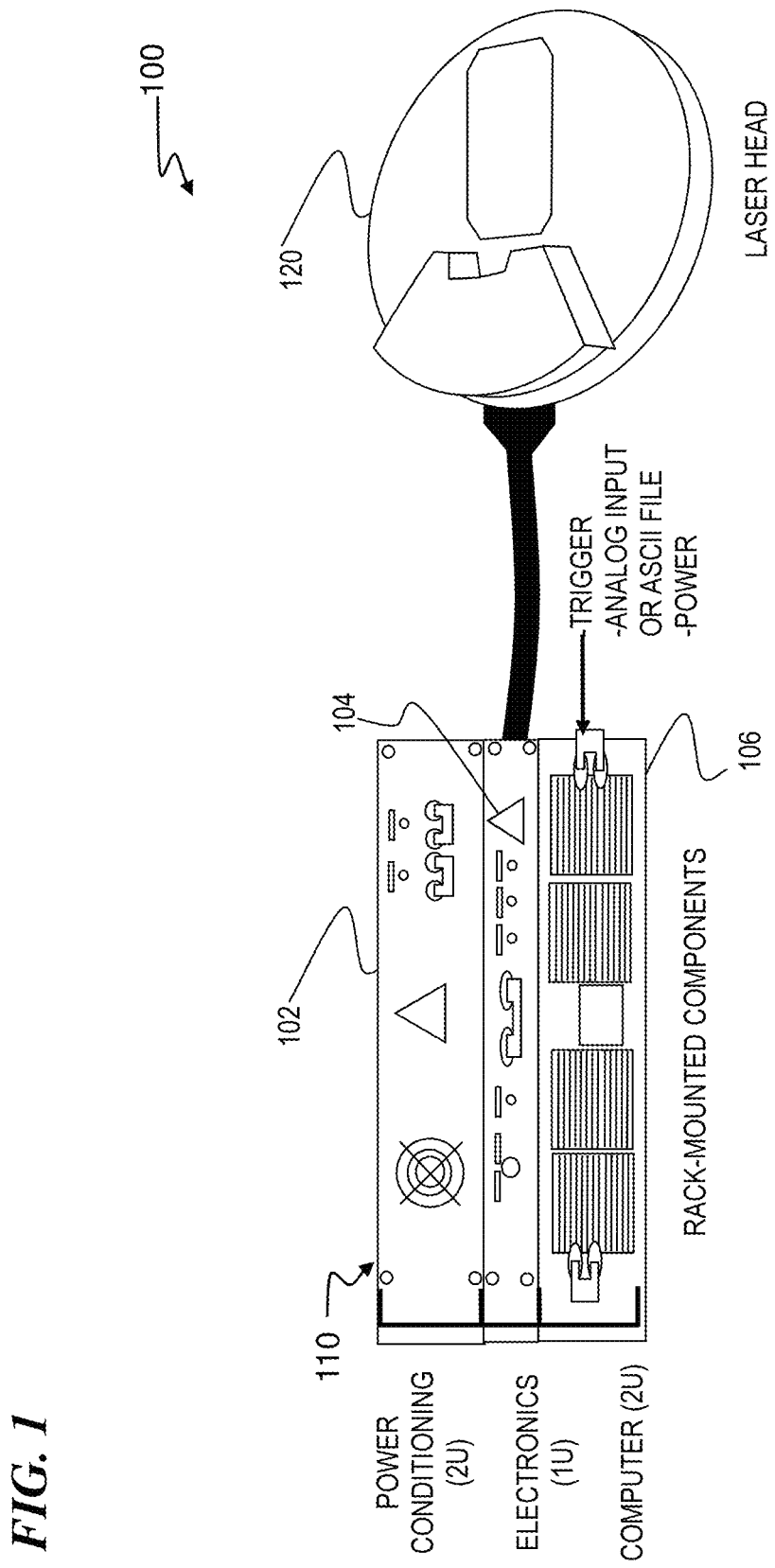
FIG. 1 shows an embodiment of a Mid-IR Test Source 100 composed of three rack-mounted components and an ATADS (Army Tactical Air Defense System) laser head.

FIG. 1 shows a mid-IR test source 100 is composed of three rack-mounted components and the ATADS (Army Tactical Air Defense System) laser head, according to some embodiments. In some embodiments, source 100 includes an electrical driver 110 and a laser head 120. In some embodiments, electrical driver 110 includes a computer 106, which drives electronics 104, which in turn generates a plurality of signals that are amplified by power-conditioning electronics 102 and sent to laser head 120. In some embodiments, laser head 120 includes a plurality of relatively high-power (1.5 watts or greater, in some embodiments, operated at a 33% duty cycle (0.5 watts average)) mid-IR OPSLs, each of which outputs an IR signal of a desired IR wavelength. In some embodiments, source 100 includes a mid-IR test source that includes three (3) rack-mounted components and the ATADS laser head.

Figure 2:
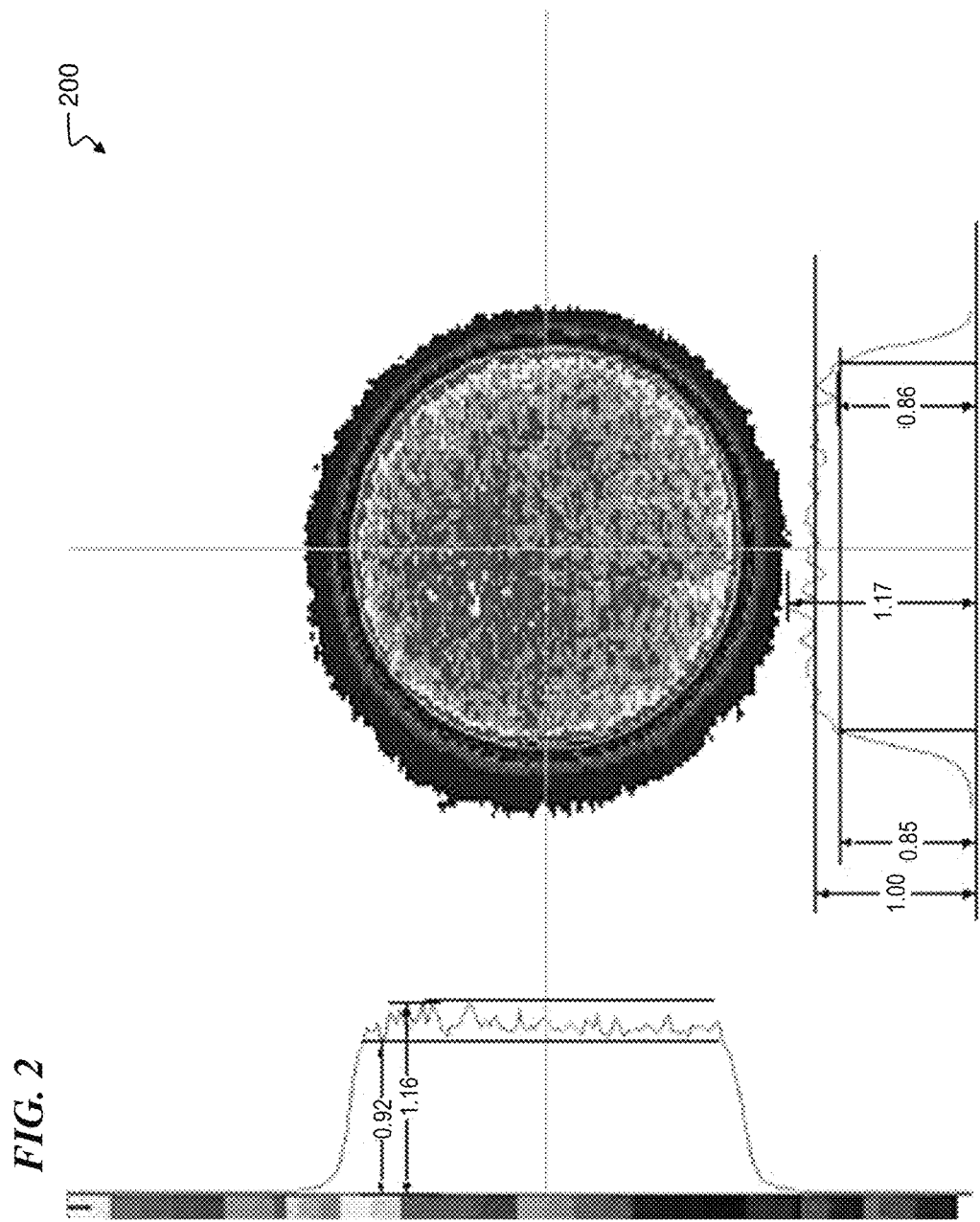
FIG. 2 is a graph 200 showing a spatial profile with a flat-top intensity distribution in the far field generated by source 100.

FIG. 2 is a graph 200 of laser intensity across a two-dimensional spatial field measured at a distance from the laser head (e.g., in some embodiments the laser intensity spatial field is measured at a distance that is about 50 m from the laser head, in some embodiments, the laser intensity spatial field is measured at a distance that is about 100 m from the laser head, in other embodiments the laser intensity spatial field is measured at a distance that is about 250 m from the laser head, in other embodiments the laser intensity spatial field is measured at a distance that is about 500 m from the laser head, in other embodiments the laser intensity spatial field is measured at a distance that is about 1000 m from the laser head, in other embodiments the laser intensity spatial field is measured at a distance that is about 5000 m from the laser head) showing that in some embodiments the source 100 generates a flat-top intensity distribution in the far field.

Figure 3:
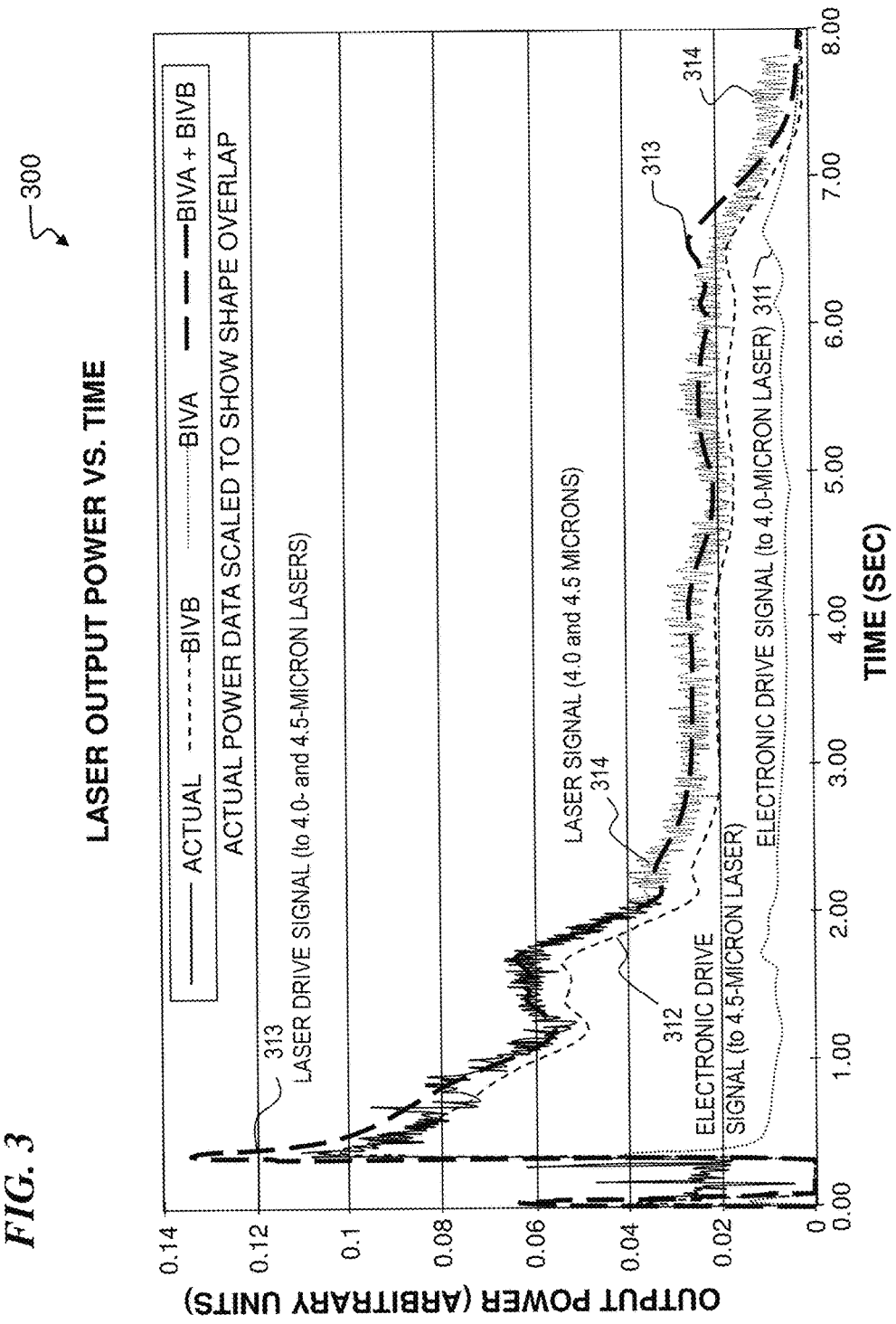
FIG. 3 is a graph 300 showing laser output power as a function of time according to some embodiments of the present invention.

FIG. 3 is a graph of laser output versus time, which shows that the laser apparatus 120 of the present invention in some embodiments simulates the brightness- and temperature signature of an approaching missile.

Figure 4:
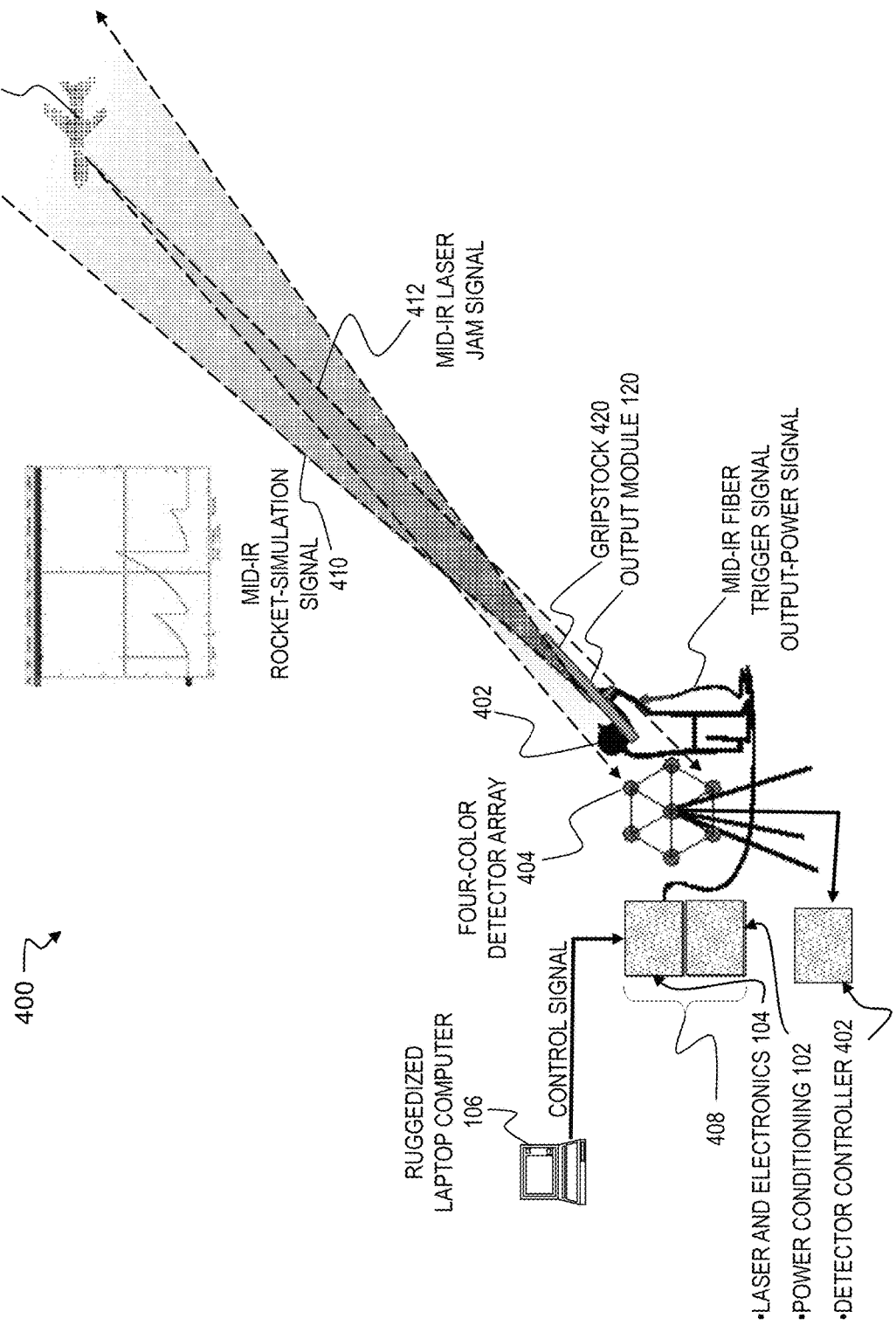
FIG. 4 is block-diagram depiction of a system 400 showing one embodiment of the "Simulator" that includes a portable IR-signature-simulation and -detection system for field testing IRCM (infra-red countermeasures to missiles).

FIG. 4 shows an embodiment system 400 of the present invention that includes ruggedized-laptop computer 106 used to provide control signals to electronics 408, fiber-coupled dual Band IVa,b laser source 120 contained within or connected to gripstock 420, mid-IR detector array 404, and controls and electronics 408. In some embodiments, electronics 408 includes the laser driver electronics 102 and 104, as well as the electronics (e.g., in some embodiments detector controller 402) that receives a signal from the detectors of detector array 404 (in some embodiments, a four-color detector array that detects any jamming signal that the aircraft 401 may generated in response to simulation signal 410). In some embodiments, the invention provides an in-the-field test system that can at any arbitrary time be used to determine whether or not (and/or how well and how fast) the aircraft's infra-red countermeasures (IRCM) equipment is working (detecting and correctly identifying the simulated signal and generating the appropriate countermeasures response).

Figure 5:
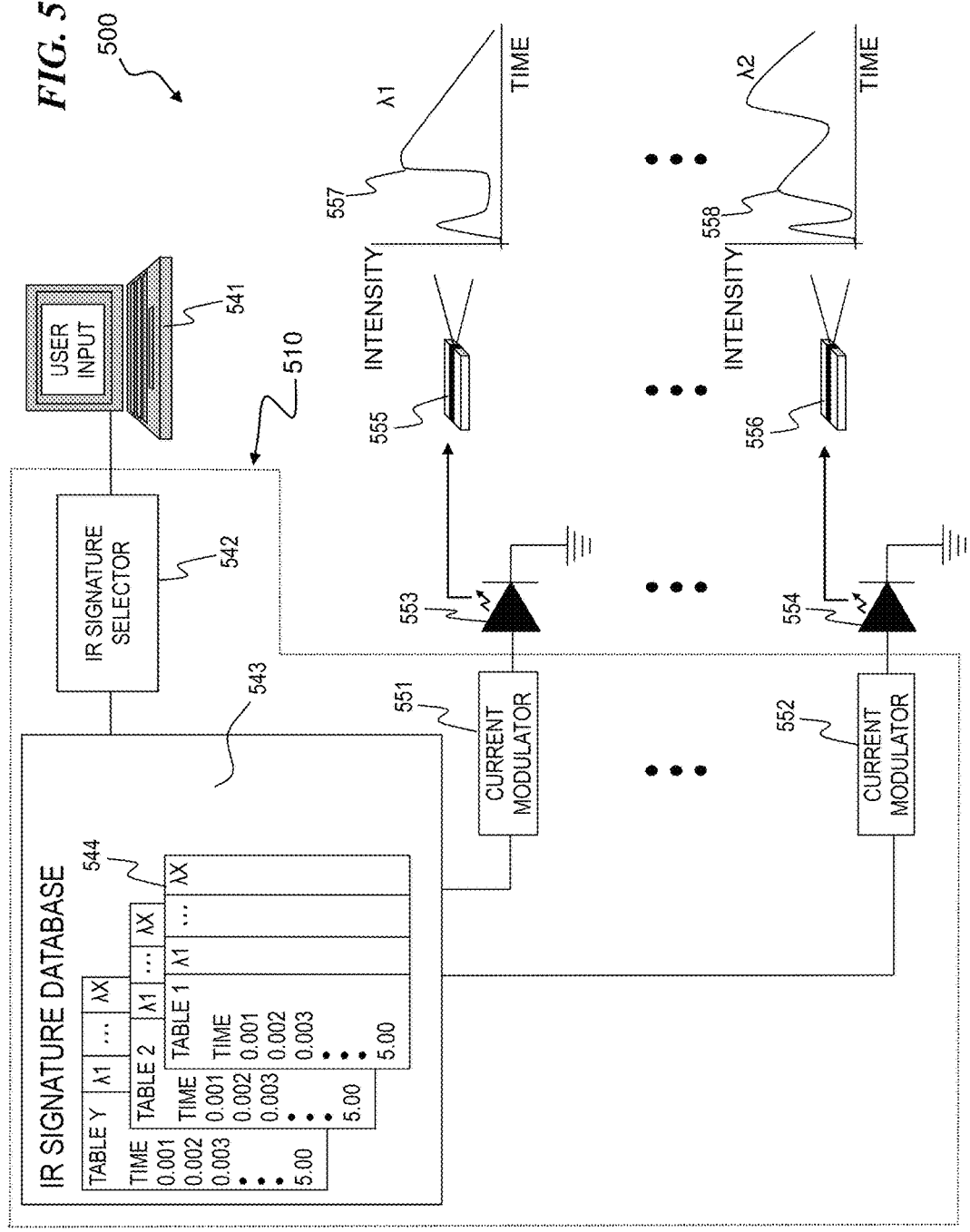
FIG. 5 is a block diagram of system 500, a mid-IR combustion simulation apparatus capable of simulating multiple wavelengths with time-varying output intensities to simulate the combustion signature of a variety of IR sources.

FIG. 5 is a block diagram of system 500 of the present invention, a mid-IR combustion simulation apparatus capable of simulating multiple wavelengths with varying output intensities in order to simulate the combustion signature of a variety of IR sources. As used herein, a combustion signature is an optical signal having a power or intensity that varies with time. In some embodiments, computer 541 is utilized by a system user to select the appropriate source signature database for simulating the desired IR source (e.g., in some embodiments, a missile combustion signature or a missile countermeasure flare combustion signature). In some embodiments, the user input is transmitted to the control electronics 510 wherein the IR signature selector 542 takes the input supplied by the user through computer 541 and selects the appropriate IR signature look-up table (LUT) 544 from the IR signature database 543. In some embodiments, the IR signature database contains a plurality of IR signature look-up tables (LUTs) 544, each of which contains the time varying output intensity of a plurality of wavelengths to describe and simulate the combustion signature of a variety of IR sources (e.g., in some embodiments, the combustion signature of surface-to-air missiles, air-to-air missiles or IR countermeasures (e.g., IR decoy flares)). In some embodiments, the LUT 544 includes multiple columns of data including a time column that includes the time unit information (in some embodiments, the time unit is about no more than one millisecond, in other embodiments the time unit is about no more than two milliseconds, in other embodiments the time unit is about no more than five milliseconds, in other embodiments the time unit is about no more than 10 milliseconds, in other embodiments the time unit is about no more than 20 milliseconds, in other embodiments the time unit is about no more than 50 milliseconds, in other embodiments the time unit is about no more than 100 milliseconds) and multiple columns that include the output intensity for a given wavelength, the output intensity provided as a function of the time unit column. In some embodiments, the LUT includes output intensity columns for two distinct wavelengths (e.g., in some embodiments, the first wavelength column includes output intensity data for wavelengths in the range of about 3.8 to 4.2 microns and the second wavelength column includes output intensity data for wavelengths in the range of about 4.4 to 4.8 microns). In some embodiments, the wavelength dependent output intensity data from the selected LUT is transmitted to current modulators 551 and 552 that control semiconductor diode pump lasers 553 and 554, respectively (e.g., in some embodiments, semiconductor diode pump lasers 553 and 554 include 1.85 micron high-power laser diode stacks such as are available from Applied Optronics—A Division of Candela, 111 Corporate Boulevard, Building J, South Plainfield, N.J. 07080). In some embodiments, semiconductor diode pump lasers 553 and 554 provide optical radiation to optically pump semiconductor lasers 555 and 556, respectively such that semiconductor laser 555 outputs a first optical signal 557 having a wavelength in the mid-IR region with an output intensity that varies over time and semiconductor laser 556 outputs a second optical signal. 558 having a wavelength in the mid-IR region with an output intensity that varies over time independently from first optical signal 557. In some embodiments, the wavelengths of at least the first and/or second optical signals are chosen to be located within an atmospheric-transparency window. As used herein, an atmospheric-transparency window is a band of wavelengths in which the atmosphere is relatively highly transparent to signals having a wavelength in the band of wavelengths. In some embodiments, semiconductor laser 555 is an optically pumped semiconductor laser (OPSL) with an output wavelength with a range of about 3.8 to 4.2 microns and semiconductor laser 556 is an (OPSL) with an output wavelength with a range of about 4.5 to 4.8 microns (e.g., such as described by Ron Kaspi et. al., "High power and high brightness from an optically pumped InAs.InGaSb type-II midinfrared laser with low confinement" Applied Phys. Lett. 81(3):406-8, Jul. 15, 2002, and U.S. Pat. No. 6,553,045, which is hereby incorporated herein by reference, each of which can be configured to output each one of the desired wavelengths in the desired bands). In other embodiments, semiconductor laser 555 includes an OPSL with an output wavelength with a range of about 3.9 to 4.1 microns and semiconductor laser 556 includes an OPSL with an output wavelength with a range of about 4.4 to 4.6 microns. In other embodiments, semiconductor laser 555 and semiconductor laser 556 include OPSLs with an output wavelength in either the mid-IR wavelength region or the long-IR region of the electromagnetic spectrum. In some embodiments, semiconductor laser 555 is a quantum cascade laser (QCL) with an output wavelength with a range of about 3.8 to 4.2 microns and semiconductor laser 556 is a QCL with an output wavelength with a range of about 4.5 to 4.8 microns (e.g., in some embodiments, semiconductor laser 556 is a QCL such as are available from Pranalytica Inc., 1101 Colorado Avenue, Santa Monica, Calif. 90401). In other embodiments, semiconductor laser 555 is a QCL with an output wavelength with a range of about 3.9 to 4.1 microns and semiconductor laser 556 is a QCL with an output wavelength with a range of about 4.4 to 4.6 microns. In other embodiments, semiconductor laser 555 and semiconductor laser 556 are QCLs with an output wavelength in either the mid-IR wavelength region or the long-IR region of the electromagnetic spectrum. In some embodiments, the wavelength-dependent output intensity data from the selected LUT is transmitted to current modulators 551 and 552 that drive the QCLs directly.

Figure 6:
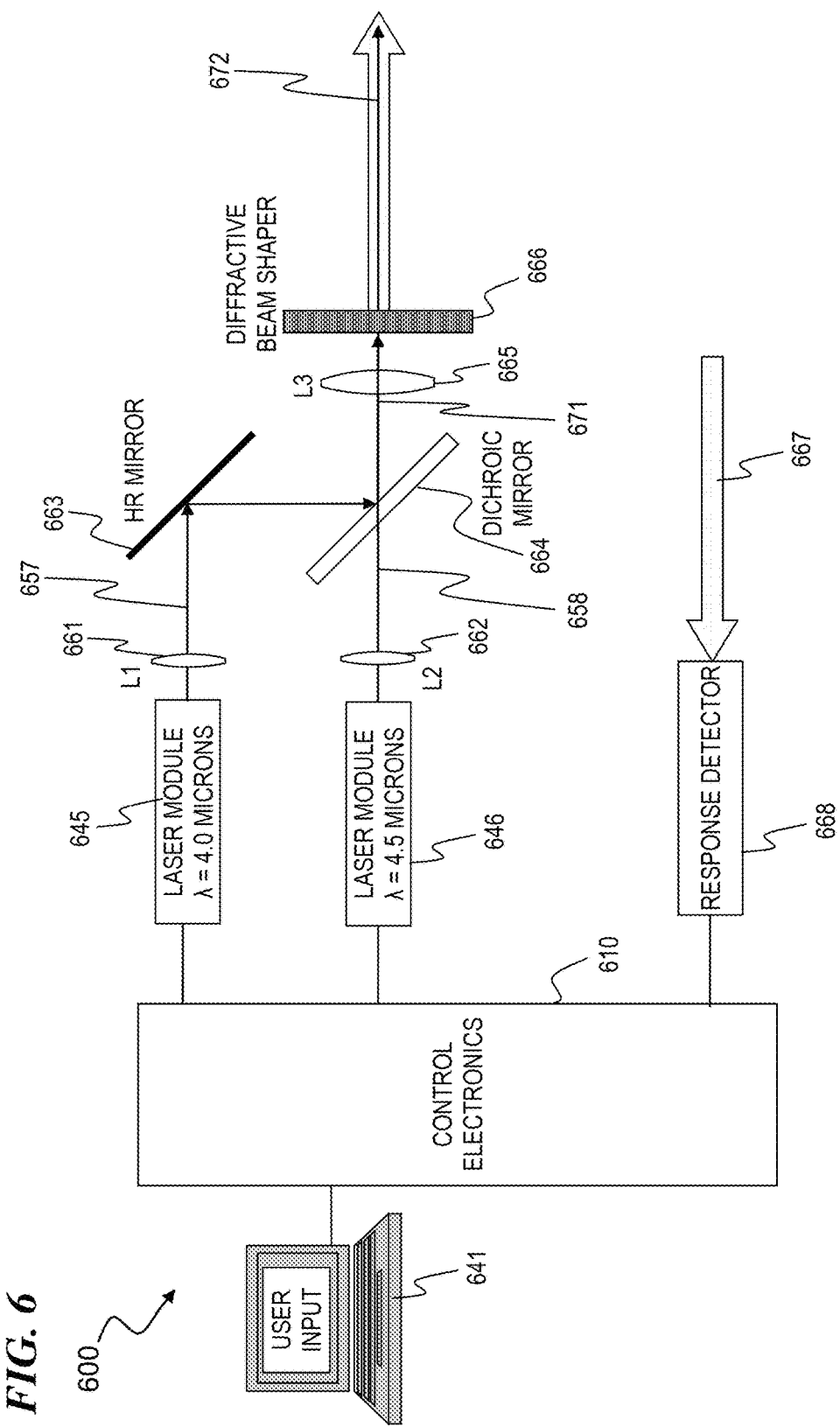
FIG. 6 is a block diagram of system 600, a mid-IR combustion simulation apparatus capable of simulating multiple wavelengths with time-varying output intensities to simulate the combustion signature of a variety of IR sources.

FIG. 6 is a block diagram of system 600 of the present invention, a mid-IR combustion simulation apparatus capable of simulating multiple wavelengths with varying output intensities in order to simulate the combustion signature of a variety of IR sources. In some embodiments, computer 641 is utilized by a system user to select the appropriate IR source signature database for simulating the desired IR source (e.g., in some embodiments, a missile combustion signature or a missile countermeasure flare combustion signature). In some embodiments, the user input is transmitted to the control electronics 610 to select a mid-IR combustion signature of a desired IR source for which the system user desires to simulate. In some embodiments, control electronics 610 transmits signals to laser module 655 and 656, respectively to control the output intensity of each laser module. In some embodiments, laser module 645 outputs a first optical signal 657 having a wavelength around 4.0 microns with an output intensity that varies over time and laser module 646 outputs a second optical signal 658 having a wavelength around 4.5 microns with an output intensity that varies over time independently from first optical signal 657. In some embodiments, first optical signal 657 passes through collimating lens 661, is essentially completely reflected by high reflectivity mirror 663 and is further essentially completely reflected by dichroic mirror 664 (e.g., in some embodiments, dichroic mirror 664 (e.g., such as are available from ISP Optics, 1 Bridge St. #205, Irvington, N.Y. 10533 (www.ispoptics.com) or Optarius, PO Box 2271, Malmesbury SN16 9FA, United Kingdom) reflects approximately 100 percent of incident light having a wavelength of about 4.0 microns and transmits approximately 100 percent of incident light having a wavelength of about 4.5 microns). In some embodiments, second optical signal 658 passes through collimating lens 662 and is then essentially completely transmitted through dichroic mirror 664 whereby first optical signal 657 and second optical signal 658 are combined into intermediate output beam 671 and bore-sighted to have a coincident beam. In some embodiments, intermediate output beam passes through focusing lens 665 and is then passed through (or, in the case of reflective diffraction beam shapers, reflected from) diffractive beam shaper 666 (e.g., as produced by Tessera North America, 9815 David Taylor Drive, Charlotte, N.C. 28262 (www.tessera.com, and in particular, www.tessera.com/technologies/products/micro_optics/diffractive_beamshapers.htm) or MEMS Optical, Inc. 205 Import Circle, Huntsville, Ala. 35806) which remaps the incident wavefront to a desired intensity and phase profile at a specified plane to create a top-hat profile for output beam 672. In some embodiments, output beam 672 has a substantially uniform top-hat spatial intensity profile in the far-field region. In some embodiments, system 600 includes a response detector 668 configured to receive and/or detect any response 667 from the target being tested (e.g., an optical jamming signal, radio-jamming signal or flares in some embodiments).

In some embodiments, the present invention provides a system that is packaged in a "Ruggedized" package for extended use in the field, and which can measure beam intensity, uniformity, jitter, co-bore-sight, and other like parameters.

System Overview

In some embodiments, the mid-infrared test source 100 includes a two-color continuous-wave (CW) laser that can simulate a variety of infrared sources (e.g., aircraft, MANPADS (man-portable air-defense systems), or flares) for testing infrared-sensor systems. The laser source provides emission at two or more user-selected wavelengths between two and five microns. The laser source simulates different blackbody temperatures by allowing the user to vary the power in the two colors independently. The laser source can generate flexible temporal source characteristics with the use of an analog input signal or stored digital waveforms with rise times as short as 2 microseconds.

Optical Performance

The nominal performance of the laser source is summarized in Table 1. In some embodiments, the mid-infrared test source 100 is based on optically pumped semiconductor lasers (OPSLs). OPSLs are "engineered," in that they can be fabricated to emit at any given wavelength in the mid-IR spectrum. In some embodiments, the OPSLs are pumped with the optical output from indium phosphide (InP) laser-diode stacks and operate at cryogenic temperatures. The light from the diode stacks is focused down to a narrow stripe that defines the lasing region in the OPSL. A separate diode stack is used to pump each of the two OPSLs. The OPSL beams are combined and transmitted out of the laser via the output telescope.

TABLE 1

Nominal performance of the laser source.

| PARAMETER | VALUE |
|---|---|
| Laser type | Optically-Pumped Semiconductor Laser (OPSL) |
| Peak output power | >1.5 W (per band, 33% duty) |
| Average power | >0.5 W (per band) |
| Run time | 15 seconds |
| Continuous power | >0.05 W (per band, 5% duty, indefinite duration) |
| Time between runs | ≥4 minutes |
| Emission wavelengths, (2): | 2.4 to 4.8 microns range |
| Beam size, shape, divergence | Customer specified |
| Beam parameter product | >50 mm-mr (millimeter-milliradian) |
| Bandwidth, instantaneous (FWHM) | 50 nm (nominal) |
| Wavelength chirp | <50 nm |
| Power stability | <5% RMS |
| Modulation | 1 Hz to 100 kHz |
| Modulation depth (each color independently) | 0 to 100% |

The beam parameter product (BPP) is the product of a laser beam's divergence angle (half-angle) and the radius of the beam at its narrowest point (the beam waist).

In some embodiments, the output telescope can include sampling optics and detectors for measuring the actual transmitted power in each wavelength band, if necessary. The measured power provides feedback to a control circuit that varies the drive power to precisely match the output signal to the commanded signal. In some embodiments, the telescope also contains optics for expanding the beam and generating a flat-top beam shape (see FIG. 2 and FIG. 6) using a diffractive diffuser, if desired. The divergence can be selected by the customer based on the target size and range or the accuracy of the beam pointer. Flat-top distributions can be produced with divergences as low as 0.5 degrees. In some embodiments, the minimum beam parameter product is limited by the OPSL beam quality along the slowly divergent direction to about 50 mm-mr FW $1/e^2$ (full-width measured to $1/e^2$ of the maximum intensity) or greater. In some embodiments, the minimum beam parameter produced by a QCL based system is less than 10 mm-mr $FW1/e^2$.

In some embodiments, the cooling subsystem of the OPSL-based high-brightness light source uses the heat capacity of the laser to store waste heat during operation and then cools the heat sinks between firing sequences. In some embodiments, the OPSL is cooled with a small Sterling-cycle cryo-cooler that is air-cooled so there are no circulating fluids or liquid nitrogen to maintain. In some embodiments, the pump diodes are cooled with thermo-electric coolers (TECs) such as Peltier devices, for example. In some embodiments, the laser 120 nominally runs for fifteen (15) seconds at an average duty cycle of 33% (i.e., CW with the average amplitude equal to 33% of the maximum) followed by a four-minute cool-down period. Any combination of power, runtime, duty cycle, and cool-down time in which the waste heat and recovery time are equal to that in the nominal case can be obtained. For example, it is possible to run at full power CW (100% duty cycle) for five seconds followed by a four-minute cool down or to run at half power CW for five seconds followed by a two-minute cool down. A low-power alignment mode provides continuous operation with a 5% duty cycle quasi-CW waveform at 2 kHz. In some embodiments, the OPSL-based source is ready to use in less than 12 minutes after start up.

In some embodiments, the QCL-based high-brightness light source can operate at CW (continuous-wave rather than pulsed or time-limited) and at room temperature, so the cooling system is considerably less complex and the runtime is not limited. In some embodiments, the QCL-based high-brightness light source is ready to use in much less time than the OPSL-based source.

Functionality

In some embodiments, the mid-infrared test source 100 has the flexibility to address a wide range of test situations. In some embodiments, the source can generate up to two sequential arbitrary analog signals. The color ratios can be set to any value to simulate different source temperatures for two-color missile-warning sensors. In some embodiments, the source will generate an optical signal up to seven (7) seconds long that follows the user-defined ASCII waveform (e.g., in some embodiments, the waveform is defined by a set of ASCII-encoded characters stored in a look-up table). The user can then trigger a second waveform or repeat the original waveform in a second data set provided the overall power, runtime, and duty cycle constraint is met. In some embodiments, detected response data is archived to the hard disk after each waveform is complete.

In some embodiments, the system is protected against errors in the waveform files. Limits set in the hardware protect the electronics and optics from operating outside their design range. In some embodiments, the system also has built-in self tests that isolate faults and give the user error messages to correct the fault condition, and indicator lights and the activity log show the user system status at all times.

Physical Description

In some embodiments, the mid-infrared test source 100 includes the laser head and three rack-mounted components, including: power conditioning chassis, the electronics chassis, and the computer (see FIG. 1). The power conditioning chassis can accept a broad range of input power characteristics (see Table 2) and convert the input signal to the format (voltage and current values) required to power the various components. The electronics chassis houses the interface board that routes signals between the computer and other equipment, and the closed-loop power-control circuit. In some embodiments, the computer provides the user interface for controlling the laser and monitoring status through LabView-brand software (available from National Instruments Corporation, 11500 North Mopac Expressway, Austin, Tex. 78759) via a wireless remote terminal connection.

TABLE 2

System physical parameters in one embodiment.

| PARAMETER | | VALUE |
|---|---|---|
| Dimensions: | laser head | 13-in. diameter × 4-in. high |
| | Rack mount equipment | 19 × 19 × 10.75 in. |
| Weight: | laser head | less than 30 lbs. |
| | Rack mount equipment | 60 lbs. |
| Power requirements: | | 90-240 V, 50-60 Hz, 400 W average, 1.5 kW peak |

In some embodiments, the three chassis can be mounted in a standard 19-inch equipment rack. The system described here is intended for lab use although it is based on a design that must function in ambient temperatures between −20 C and +55 C (−20 degrees Celsius and +55 degrees Celsius) and the components and subassemblies have been tested over this range. In some embodiments, the system is portable and is able to be transported to various testing locations. In some embodiments, the system is battery operated.

In some embodiments, all of the optics in the mid-infrared laser source are enclosed within a sealed cavity in the laser head. In some embodiments, the laser head, including one or more OPSLs (or alternatively one or more QCLs), pump diodes, cryo-cooler, drive electronics, and cooling fins and fans are packaged into a 13-inch-diameter by 4-inch-thick integrated assembly 120 of FIG. 1.

In some embodiments, the present invention provides a method that includes outputting an optical signal having a plurality of wavelengths, each having an output intensity that is varied over time to simulate a combustion signature of a weapon. In some embodiments, the optical signal includes at least two different infrared wavelengths having output intensities that are varied differently with time. In some embodiments, the at least two different infrared wavelengths are generated by optically pumped semiconductor lasers (OPSLs). In some embodiments, the at least two different infrared wavelengths are generated by quantum cascade lasers (QCLs). In some embodiments, the at least two different infrared wavelengths are generated by optical parametric oscillators (OPOs). In some embodiments, the at least two different infrared wavelengths are generated by optical parametric generators (OPGs). In some embodiments, one wavelength is generated by one type of device selected from the group consisting of OPSL, QCL, OPO and OPG, and the other wavelength is generated by a different type of device.

In some embodiments, the present invention provides an apparatus that includes control electronics that generate an electronic control signal; and means, operatively coupled to the control electronics, for outputting an optical signal having a plurality of wavelengths each of which has an intensity that is varied over time to simulate a combustion signature of a weapon. In some embodiments, the optical signal includes at least two different infrared wavelengths that are varied differently with time. In some embodiments, the at least two different infrared wavelengths are generated by OPSLs. In some embodiments, the at least two different infrared wavelengths are generated by QCLs. In some embodiments, the at least two different infrared wavelengths are generated by OPOs. In some embodiments, the at least two different infrared wavelengths are generated by OPGs. In some embodiments, one wavelength is generated by one type of device selected from the group consisting of OPSL, QCL, OPO and OPG, and the other wavelength is generated by a different type of device.

In some embodiments, the present invention provides an apparatus that includes control electronics that generate an electronic control signal; and a plurality of optically pumped semiconductor lasers, operatively coupled to the control electronics, that output an optical signal having a plurality of wavelengths, each of which has an output intensity that is varied over time to simulate a combustion signature of a weapon. In some embodiments, the optical signal includes at least two different infrared wavelengths having output intensities that are varied differently with time relative to one another.

In some embodiments, the apparatus also includes the capability to generate one or more false signatures (i.e., signatures that should not be identified as a weapon launch or other combustion signature), and the detector determines whether a response was incorrectly triggered as a result of the false signature.

In some embodiments, the present invention provides a method that includes, during a first time period, outputting a first optical signal having a first wavelength that has an output intensity that is varied over time to simulate a first wavelength of a combustion signature; and during the first time period, outputting a second optical signal having a second wavelength, that is different than the first wavelength, and that has an output intensity that is varied over time in a manner that is different than the intensity variation of the first wavelength, in order to simulate a second wavelength of the combustion signature.

In some embodiments of the method, the first wavelength is an infrared wavelength that is in an atmospheric-transparency window, and wherein the second wavelength is an infrared wavelength that is longer than the first wavelength and wherein the intensity of the second wavelength is greater than the intensity of the first wavelength for at least some of the first time period.

Some embodiments of the method further include generating at least one of the first optical signal and the second optical signal using an optically pumped semiconductor laser.

Some embodiments of the method further include generating at least one of the first optical signal and the second optical signal using a quantum cascade laser.

Some embodiments of the method further include looking up an intensity value for the first optical signal for each of a plurality of successive time units in the first time period, and based on the looked-up intensity value, controlling the intensity of the first optical signal.

Some embodiments of the method further include varying the first optical signal intensity with a non-zero time resolution of no more than two milliseconds.

Some embodiments of the method further include detecting a response of a missile-warning system to the first and second optical signals; and determining whether the response is within a specification of correct responses.

In some embodiments of the method, the first wavelength of the first optical signal is in a range of about 3.8 to 4.2 microns and the second wavelength of the second optical signal is in a range of about 4.4 to 4.8 microns.

In some embodiments of the method, the first wavelength of the first optical signal is in a range of 3.95 to 4.05 microns and the second wavelength of the second optical signal is in a range of 4.55 to 4.65 microns.

Some embodiments of the method further include bore-sighting the first optical signal and the second optical signal to have a coincident beam in the far field, the beam having a substantially uniform top-hat spatial intensity profile.

Some embodiments of the method further include modulating the intensity of the first optical signal to have at least two local maximums within the first time period; and modulating the second optical signal to have at least two local maximums within the first time period.

In some embodiments, the present invention provides an apparatus that includes control electronics configured to generate a first electronic control signal and a second electronic control signal; a first laser system operatively coupled to the control electronics, configured to output a first optical signal having a first wavelength that has an output intensity that is varied over time based on the first electronic control signal, during a first time period, to simulate a first wavelength of a combustion signature; a second laser system operatively coupled to the control electronics, configured to output a second optical signal having a second wavelength, that is different than the first wavelength, and that has an output intensity that is varied over time based on the second electronic control signal, during the first time period, in a manner that is different than the intensity variation of the first wavelength, in order to simulate a second wavelength of the combustion signature; and an optical element optically coupled to the first laser system and the second laser system to receive the first and second optical signal, and configured to form a far-field output beam that includes the first optical signal and the second optical signal substantially coincident with one another.

In some embodiments of the apparatus, the first wavelength is an infrared wavelength that is in an atmospheric-transparency window, and wherein the second wavelength is an infrared wavelength that is longer than the first wavelength and wherein the intensity of the second wavelength is greater than the intensity of the first wavelength for at least some of the first time period.

In some embodiments of the apparatus, at least one of the first optical signal and the second optical signal is generated by an optically pumped semiconductor laser.

In some embodiments of the apparatus, at least one of the first optical signal and the second optical signal is generated by a quantum cascade laser.

Some embodiments of the apparatus further include a look-up table operably coupled to the control electronics, wherein the look-up table is configured to provide an intensity value for the first optical signal for each of a plurality of successive time units in the first time period, wherein the intensity value is used to control the output intensity of the first optical signal.

In some embodiments of the apparatus, the first optical signal's output intensity is varied with a non-zero time resolution of no more than two milliseconds.

Some embodiments of the apparatus further include a detector operatively coupled to the control electronics, wherein the detector is configured to detect an output response of a missile-warning system responsive to the first and second optical signals and to determine whether the output response is within a specification of correct output responses.

In some embodiments of the apparatus, the first wavelength of the first optical signal is at least 3.9 microns and no more than 4.1 microns and the second wavelength of the second optical signal is at least 4.5 microns and no more than 4.7 microns.

In some embodiments of the apparatus, the first optical signal and the second optical signal are bore-sighted to have a coincident beam in the far field, the beam having a substantially uniform top-hat spatial intensity profile.

In some embodiments of the apparatus, the intensity of the first optical signal is modulated to have at least two local maximums within the first time period and the second optical signal is modulated to have at least two local maximums within the first time period.

In some embodiments, the present invention provides an apparatus that includes means for outputting, during a first time period, a first optical signal having a first wavelength that has an output intensity that is varied over time to simulate a first wavelength of a combustion signature; and means for outputting, during the first time period, a second optical signal having a second wavelength, that is different than the first wavelength, and that has an output intensity that is varied over time in a manner that is different than the intensity variation of the first wavelength, in order to simulate a second wavelength of the combustion signature.

In some embodiments of this apparatus, the first wavelength is an infrared wavelength that is in an atmospheric-transparency window, and wherein the second wavelength is an infrared wavelength that is longer than the first wavelength and wherein the intensity of the second wavelength is greater than the intensity of the first wavelength for at least some of the first time period.

In some embodiments of this apparatus, at least one of the means for outputting the first optical signal and the means for outputting the second optical signal includes an optically pumped semiconductor laser.

In some embodiments of this apparatus, at least one of the means for outputting the first optical signal and the means for outputting the second optical signal includes a quantum cascade laser.

Some embodiments of this apparatus further include means for looking up an intensity value for the first optical signal for each of a plurality of successive time units in the first time period, and means for controlling the intensity of the first optical signal based on the looked-up intensity value.

In some embodiments of this apparatus, the means for looking up and the means for controlling the first optical signal intensity include means for varying the intensity with a non-zero time resolution of no more than two milliseconds.

Some embodiments of this apparatus further include means for detecting a response of a missile-warning system to the first and second optical signals; and means for determining whether the response is within a specification of correct responses, wherein the means for determining is operatively coupled to the means for detecting.

In some embodiments of this apparatus, the first wavelength of the first optical signal is in a range of about 3.8 to 4.2 microns and the second wavelength of the second optical signal is in a range of about 4.4 to 4.8 microns.

In some embodiments of this apparatus, the first wavelength of the first optical signal is in a range of 3.95 to 4.05 microns and the second wavelength of the second optical signal is in a range of 4.55 to 4.65 microns.

Some embodiments of this apparatus further include means for bore-sighting the first optical signal and the second optical signal to have a coincident beam in the far field; and means for configuring the beam to have a substantially uniform top-hat spatial intensity profile.

Some embodiments of this apparatus further include means for modulating the intensity of the first optical signal to have at least two local maximums within the first time period; and means for modulating the second optical signal to have at least two local maximums within the first time period.

In some embodiments, various systems and concepts described in the related applications that were incorporated by reference above are combined with aspects and/or parts of the optical simulation aspects of the present invention and form parts of some embodiments of the present invention.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   during a first time period, outputting a first laser signal having a first wavelength that has an output intensity that is varied over time to simulate a first wavelength of a combustion signature;
   during the first time period, outputting a second laser signal having a second wavelength, that is different than the first wavelength, and that has an output intensity that is varied over time in a manner that is different than the intensity variation of the first wavelength, in order to simulate a second wavelength of the combustion signature, wherein the first wavelength is an infrared wavelength that is in an atmospheric-transparency window, and wherein the intensity of the second wavelength is greater than the intensity of the first wavelength for the first time period; and
   generating at least one of the first laser signal and the second laser signal using an optically pumped laser.

2. The method of claim 1, wherein the second wavelength is an infrared wavelength that is longer than the first wavelength.

3. The method of claim 1, further comprising:
   looking up an intensity value for the first laser signal for each of a plurality of successive time units in the first time period, and based on the looked-up intensity value, controlling the intensity of the first laser signal.

4. The method of claim 1, further comprising:
   varying the first laser signal intensity with a non-zero time resolution of no more than two milliseconds.

5. The method of claim 1, further comprising:
   detecting a response of a missile-warning system to the first and second laser signals; and
   determining whether the response is within a specification of correct responses.

6. The method of claim 5, wherein the detecting of the response of the missile-warning system includes detecting a countermeasure jamming signal generated by the missile-warning system in response to the first and second laser signals.

7. The method of claim 1, wherein the first wavelength of the first laser signal is in a range of about 3.8 to 4.2 microns and the second wavelength of the second laser signal is in a range of about 4.4 to 4.8 microns.

8. The method of claim 1, further comprising:
   modulating the intensity of the first laser signal to have at least two local maximums within the first time period; and
   modulating the second laser signal to have at least two local maximums within the first time period.

9. An apparatus comprising:
   control electronics configured to generate a first electronic control signal and a second electronic control signal;
   a first laser system operatively coupled to the control electronics, configured to output a first laser signal having a first wavelength that has an output intensity that is varied over time based on the first electronic control signal, during a first time period, to simulate a first wavelength of a combustion signature;
   a second laser system operatively coupled to the control electronics, configured to output a second laser signal having a second wavelength, that is different than the first wavelength, and that has an output intensity that is varied over time based on the second electronic control signal, during the first time period, in a manner that is different than the intensity variation of the first wavelength, in order to simulate a second wavelength of the combustion signature; and
   an optical element optically coupled to the first laser system and the second laser system to receive the first and second laser signal, and configured to form a far-field output beam that includes the first laser signal and the second laser signal substantially coincident with one another, wherein the first wavelength is an infrared wavelength that is in an atmospheric-transparency window, wherein the second wavelength is an infrared wavelength that is longer than the first wavelength, and wherein the intensity of the second wavelength is greater than the intensity of the first wavelength for first time period.

10. The apparatus of claim 9, wherein at least one of the first laser signal and the second laser signal is generated by an optically pumped laser.

11. The apparatus of claim 9, wherein at least one of the first laser signal and the second laser signal is generated by a quantum cascade laser.

12. The apparatus of claim 9, further comprising: a look-up table operably coupled to the control electronics, wherein the look-up table is configured to provide an intensity value for the first laser signal for each of a plurality of successive time units in the first time period, wherein the intensity value is used to control the output intensity of the first laser signal.

13. The apparatus of claim 12, wherein the first laser signal's output intensity is varied with a non-zero time resolution of no more than two milliseconds.

14. The apparatus of claim 9, further comprising: a detector operatively coupled to the control electronics, wherein the detector is configured to detect an output response of a missile-warning system responsive to the first and second laser signals and to determine whether the output response is within a specification of correct output responses.

15. The apparatus of claim 14, wherein the detector is configured to detect a countermeasure jamming signal generated by the missile-warning system in response to the first and second laser signals.

16. The apparatus of claim 9, wherein the first wavelength of the first laser signal is at least 3.9 microns and no more than 4.1 microns and the second wavelength of the second laser signal is at least 4.5 microns and no more than 4.7 microns.

17. The apparatus of claim 9, wherein the intensity of the first laser signal is modulated to have at least two local maximums within the first time period and the second laser signal is modulated to have at least two local maximums within the first time period.

18. An apparatus comprising:
means for outputting, during a first time period, a first laser signal having a first wavelength that has an output intensity that is varied over time to simulate a first wavelength of a combustion signature; and
means for outputting, during the first time period, a second laser signal having a second wavelength, that is different than the first wavelength, and that has an output intensity that is varied over time in a manner that is different than the intensity variation of the first wavelength, in order to simulate a second wavelength of the combustion signature, wherein at least one of the means for outputting the first laser signal and the means for outputting the second laser signal includes an optically pumped laser, wherein the first wavelength is an infrared wavelength that is in an atmospheric-transparency window, and wherein the intensity of the second wavelength is greater than the intensity of the first wavelength for the first time period.

19. The apparatus of claim 18, further comprising:
means for looking up an intensity value for the first laser signal for each of a plurality of successive time units in the first time period, and means for controlling the intensity of the first laser signal based on the looked-up intensity value.

20. The apparatus of claim 18, further comprising:
means for detecting a response of a missile-warning system to the first and second laser signals; and
means for determining whether the response is within a specification of correct responses, wherein the means for determining is operatively coupled to the means for detecting.

* * * * *